(12) United States Patent
Mahendra Kumar et al.

(10) Patent No.: US 11,698,898 B2
(45) Date of Patent: Jul. 11, 2023

(54) LOCK WAIT TRACING

(71) Applicant: salesforce.com, inc., San Francisco, CA (US)

(72) Inventors: Piyush Kumar Jain Mahendra Kumar, Austin, TX (US); Mark F. Wilding, Issaquah, WA (US); James E. Mace, San Francisco, CA (US); Thomas Fanghaenel, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 302 days.

(21) Appl. No.: 17/089,355

(22) Filed: Nov. 4, 2020

(65) Prior Publication Data

US 2022/0138175 A1 May 5, 2022

(51) Int. Cl.
*G06F 16/23* (2019.01)
*G06F 16/22* (2019.01)

(52) U.S. Cl.
CPC ...... *G06F 16/2365* (2019.01); *G06F 16/2282* (2019.01)

(58) Field of Classification Search
CPC .................. G06F 16/2365; G06F 16/2282
USPC ....................................................... 707/694
See application file for complete search history.

(56) References Cited

U.S. PATENT DOCUMENTS

| | | | |
|---|---|---|---|
| 5,263,155 A * | 11/1993 | Wang | G06F 9/466 710/200 |
| 5,987,506 A * | 11/1999 | Carter | G06F 16/9574 711/E12.066 |
| 8,271,437 B2 | 9/2012 | Arcese et al. | |
| 9,141,965 B2 | 9/2015 | Hartman | |
| 11,474,990 B2 * | 10/2022 | Schaub | G06F 16/2343 |
| 2006/0242464 A1 * | 10/2006 | Holt | G06F 8/456 714/25 |
| 2009/0307530 A1 * | 12/2009 | Tarta | G06F 11/3668 714/38.14 |
| 2010/0191884 A1 * | 7/2010 | Holenstein | G06F 11/2094 707/613 |
| 2015/0234989 A1 | 8/2015 | Kejriwal et al. | |
| 2016/0292213 A1 * | 10/2016 | Stanfill | G06F 16/22 |
| 2016/0299949 A1 * | 10/2016 | Konik | G06F 16/24542 |
| 2019/0005083 A1 * | 1/2019 | Cook | G06F 16/27 |
| 2020/0125549 A1 * | 4/2020 | Hoang | G06F 16/2358 |

* cited by examiner

*Primary Examiner* — Pierre M Vital
*Assistant Examiner* — Fariborz Khoshnoodi
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to lock wait tracing. A computer system may operate a database that includes a lockable object. The computer may maintain a lock wait queue that stores an indication of processes waiting to acquire a lock on the lockable object. The computer system may store trace records for those processes that, upon releasing a respective lock on the lockable object when another process is waiting in the lock wait queue, have been in contention for the respective lock for over a threshold amount of time. The computer system may present ones of the trace records that identify a timeline that is usable to determine a set of processes that contributed to a delay in a process acquiring a lock on the lockable object.

20 Claims, 8 Drawing Sheets

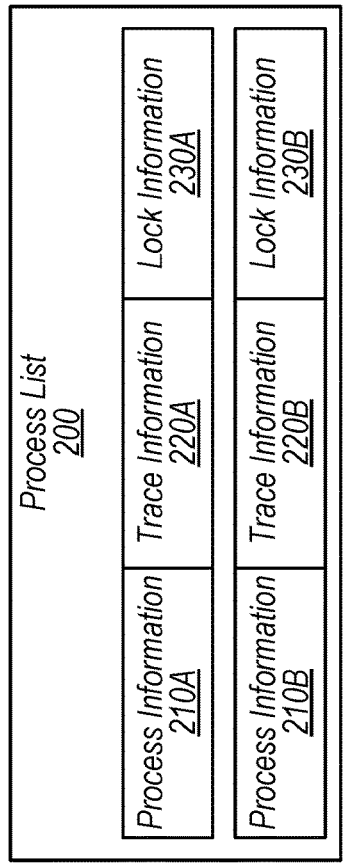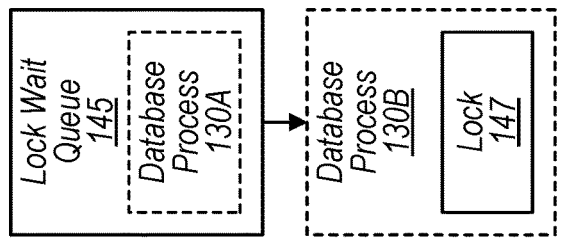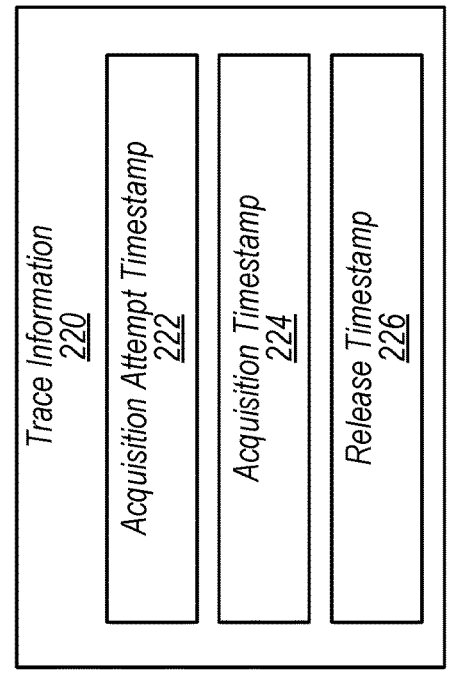
FIG. 2A
FIG. 2B

LOCK WAIT TRACING

BACKGROUND

Technical Field

This disclosure relates generally to database systems and, more specifically, lock wait tracing for database systems.

Description of the Related Art

Modern database systems typically implement a management system that allows users to store a collection of information in an organized manner that can be efficiently accessed and manipulated. Such database systems often store that information in database objects, such as database tables comprising columns and rows in which each column defines a grouping of the information. In operation, a database system normally implements multiple database processes to concurrently process database transactions that access and manipulate the data stored within database objects of a database. When processing a database transaction, a database process can acquire a lock on a database object that permits the database process to manipulate the database object while also preventing another database process from accessing and/or manipulating the database object while the former database process holds the lock.

BRIEF DESCRIPTION OF THE DRAWINGS

FIGS. 2A and 2B are block diagrams illustrating example elements of a lock wait queue, a process list, and trace information, according to some embodiments.

DETAILED DESCRIPTION

Figure 1:
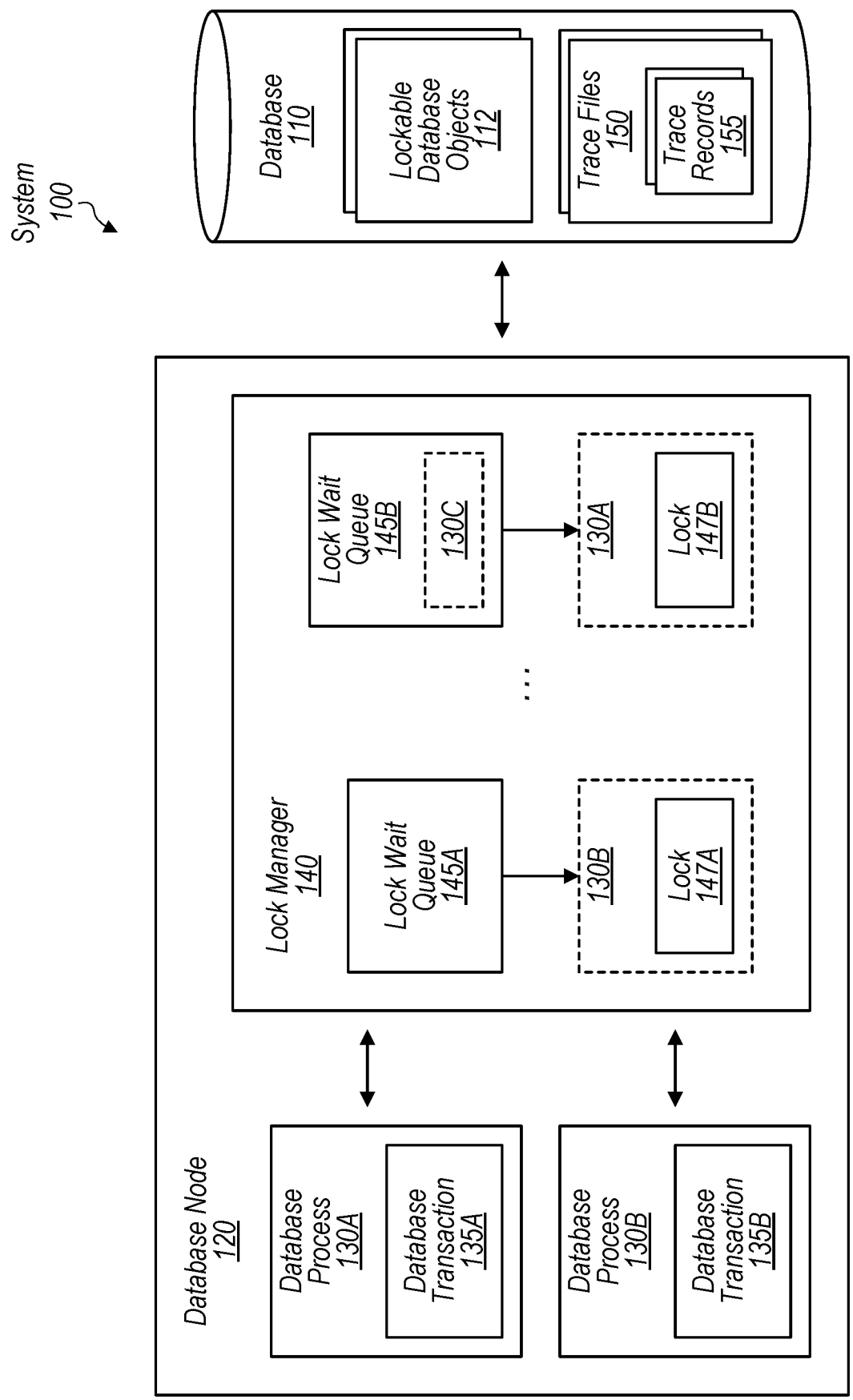
FIG. 1 is a block diagram illustrating example elements of a system capable of lock wait tracing, according to some embodiments.

As mentioned, when performing a database transaction, a database process can acquire a lock on a database object that permits the database process to carry out a database operation (e.g., access, modify, etc.) on the database object. In many instances, when a database process attempts to acquire a lock on a database object, another database process already holds a lock on that database object. Accordingly, the former database process may enter a lock wait queue, potentially behind other waiting database processes, in which it waits for its turn to acquire a lock on the database object. But in some cases, the database process waits for an unreasonable amount of time before it acquires a lock because one of the preceding database processes held a lock on the database object for too long. Current implementations, however, do not provide a sufficient mechanism for identifying which preceding database process(es) caused the former database process to wait for so long. The present disclosure addresses, among other things, this technical problem of being unable to identify those database processes that cause undesirable wait times for acquiring a lock on a database object.

More specifically, this disclosure describes various techniques for lock wait tracing in which information describing lock acquisition and lock release for various database processes is collected and analyzed to identify troublesome database processes that cause unreasonably long lock wait times. In various embodiments that are described below, a database system includes lockable database objects (e.g., a database table) and database processes that perform database transactions involving the lockable database objects. As part of performing a database transaction, a first database process may perform a database operation (e.g., execute an SQL statement) on a lockable database object. Before performing the database operation, in various embodiments, the first database process attempts to acquire a lock on the database object.

When attempting to acquire a lock, in various embodiments, the first database process initially records an acquisition attempt timestamp identifying the time at which the first database process attempted to acquire the lock. If there are no database processes waiting for the lock and no database process is already holding a conflicting lock, then the first database process obtains a lock on the lockable database object. (As discussed in more detail below, locks of different "strengths" may be acquired on an object. In some instances, a database process may attempt to acquire a lock of a particular strength that conflicts with a lock of a different strength held by another database process.) But if there is a database process waiting or a conflicting lock is held, then the first database process may enter a lock wait queue in which it waits to obtain a lock. After obtaining a lock, the first database process may perform a database operation with respect to the lockable database object (e.g., write a new record that updates a row of a database table).

The present disclosure uses the terms "victim database process" and "culprit database process" to describe its tracing paradigm. As used herein, the phrase "victim database process" refers to a database process that has been blocked temporarily by another database process from obtaining a lock. Conversely, the phrase "culprit database process" refers to a database process that temporarily blocks another database process from obtaining a lock. A culprit database process can block a victim database process by holding a lock that conflicts with a lock desired by the victim database process or by waiting ahead of the victim database process in the wait queue for the desired lock. Note that it is possible for a database process to be both a victim database process and a culprit database process.

When the first database process releases the lock (or prematurely exists from the wait queue without obtaining the lock), the first database process may create a trace record having the acquisition attempt timestamp and a release timestamp identifying a time at which the first database process released the lock. The trace record may be created if a set of criteria are met. For example, if there are no victim database processes waiting for a lock, then the first database process does not create a trace record, in various embodiments. But if there is a victim database process, then the first database process may determine if the first database process's contention period (or active period) exceeds a block time threshold (e.g., 10 milliseconds). The contention period, in various embodiments, is defined as the length of time between the time indicated by the acquisition attempt timestamp and the time indicated by the release timestamp. If the first database process's contention period exceeds a block time threshold, the first database process may determine whether an overlap period between a second database process (that is a victim database process waiting) and the first database process satisfies the block time threshold. If the overlap period satisfies the block time threshold, then the first database process may output the trace record. In some embodiments, the first database node does not perform the assessment of whether its contention period exceeds a block time threshold, but instead skips to determining whether the overlap period exceeds the block time threshold.

In various embodiments, a victim database process also creates a trace record. The trace record from a victim database process may identify an acquisition attempt timestamp and an actual acquisition timestamp that identifies a time at which the victim database process actually obtained the lock. For example, the second database process may produce a trace record since it was blocked by the first database process and thus is a victim process. The trace records that are produced by the first and second database processes may be written into files that interleave them. At a later point, a developer or a software application may retrieve and analyze the trace records relating to a victim database process to reconstruct the state of the wait queue, including who the culprit database processes were and for how long they had blocked the victim database process. Based on the reconstruction, the developer may attempt to identify issues and fix them (e.g., by a fixing an issue with a culprit database process so that it no longer blocks the victim database process for so long).

The techniques of this disclosure may be advantageous over prior approaches as they provide a mechanism for collecting information about database processes acquiring locks that can be used to construct a timeline for determining a set of database processes that contributed to a delay in a victim database process acquiring a lock on a lockable object. By being able to identify troublesome database processes using these techniques, a developer can take steps to resolve the issues with the troublesome database processes so that they do not cause subsequent delay to other database processes. Moreover, the techniques of the present disclosure provide a mechanism for pushing this information about database processes out of the database system to an external system so that it can later be analyzed and assembled into a timeline as a part of a post-processing task. By post-processing this information using an external system, database resources (e.g., processing capacity) are conserved and thus the database system does not suffer the potentially expensive processing cost associated with processing the information. As such, this information about database processes can be made available to users in an understandable format without the database system having to pay the runtime cost to assemble the information into that format. As a result, the overall operation of the database system is improved. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a database 110 and a database node 120. As shown, database 110 includes lockable database objects 112 and trace files 150 containing trace records 155. As further shown, database node 120 includes database processes 130A and 130B that perform database transactions 135A and 135B, respectively, and a lock manager 140 that includes lock wait queues 145A and 145B. In some embodiments, system 100 is implemented differently than shown. For example, trace files 150 may be written out to another system for post-processing and thus may not be stored at database 110.

System 100, in various embodiments, implements a platform service (e.g., a customer relationship management (CRM) platform service) that allows users of that service to develop, run, and manage applications. System 100 may be a multi-tenant system that provides various functionality to multiple users/tenants hosted by the multi-tenant system. Accordingly, system 100 may execute software routines from various, different users (e.g., providers and tenants of system 100) as well as provide code, web pages, and other data to users, databases, and other entities associated with system 100. As shown for example, system 100 includes database node 120 that can store and access lockable database objects 112 of database 110 on behalf of users of system 100.

Database 110, in various embodiments, is a collection of information that is organized in a manner that allows for access, storage, and manipulation of that information. Accordingly, database 110 may include supporting software that allows for database node 120 to carry out operations (e.g., accessing, storing, etc.) on information that is stored at database 110. In some embodiments, database 110 is implemented by a single or multiple storage devices connected together on a network (e.g., a storage attached network (SAN)) and configured to redundantly store information to prevent data loss. The storage devices may store data persistently and thus database 110 may serve as a persistent storage. In various embodiments, database 110 is shared between multiple database nodes 120 such that database records written by one database node 120 are accessible by the other database nodes 120. As shown, database 110 includes lockable database objects 112.

A lockable database object 112, in various embodiments, is a database object on which a database process 130 can acquire a lock. Examples of database objects include, but are not limited to, database tables, indexes, rows of a database table, stored procedures/functions, and views. In various embodiments, database 110 stores database records that underlie corresponding lockable database objects 112. As such, when a database process 130 accesses a lockable database object 112, it may access the database records underlying that database object 112. When a database process 130 modifies a lockable database object 112, it may update a preexisting database record or write a new database record for that lockable database object 112. Consider an example in which a lockable database object 112 corresponds to a row in a database table. If a database process 130 wishes to modify a value in the row, then the database process 130 may acquire a lock on the row (the lockable database object 112) that permits the database process 130 to update or write a database record for the row that includes the modified value. As discussed further below, there may be various degrees in lock strength where a "weaker" lock allows for more concurrent activity and a "stronger" lock allows for less concurrent activity. As such, the weakest lock may allow fully concurrent access while the strongest lock may obtain exclusive access that permits only the holder of the lock to access/modify a lockable database object 112 while the strongest lock is held on that object 112.

Database node 120, in various embodiments, is hardware, software, or a combination thereof capable of providing database services, such as data storage, data retrieval, and/or data manipulation. Such database services may be provided to other components within system 100 and/or to components external to system 100. As an example, database node 120 may receive a request from an application server to perform a database transaction 135 that involves a set of database operations. A database transaction 135, in various embodiments, is a unit of work that specifies one or more operations/tasks to be performed to access and possibly modify the contents stored within database 110. A database transaction 135 may identify different types of database operations, such as data manipulation language (DML) operations, data definition language (DDL) operations, data control language operations, and transaction control language operations. For example, a database transaction 135 may involve performing a SQL SELECT command to select one or more rows from one or more database tables. The contents of a row may be defined in a database record and thus database node 120 may locate and return one or more database records that correspond to the selected one or more table rows. When a database transaction request is received, in various embodiments, database node 120 spawns and assigns a database process 130 to process the corresponding database transaction 135. As a part of the processing, the database process 130 may acquire locks 147 on the lockable database objects 112 involved in that database transaction 135. Accordingly, as shown, database processes 130 interact with lock manager 140 to acquire locks 147.

Lock manager 140, in various embodiments, is a set of software routines executable to manage locks 147 on behalf of database processes 130. When a database process 130 seeks to perform one or more database operations specified in a database transaction 135, the database process 130 communicates with lock manager 140 in order to obtain locks 147. A lock 147, in various embodiments, is a permission that is granted to a database process 130 to access and/or modify a lockable database object 112. As mentioned above, in some embodiments, there are different strengths/modes of locks 147 that can be acquired on a lockable database object 112. Examples of lock modes include, but are not limited to, an "access share" mode that allows for a database process 130 to read a lockable database object 112 and an "access exclusive" mode that allows for a database process 130 to read and modify a lockable database object 112. In various cases, multiple database processes 130 may acquire the same lock mode on the same lockable database object 112. For example, four database processes 130 may acquire an access-share-mode lock 147 on a database table that permits each database process 130 to read from that database table. In some cases, only a single database process 130 may acquire a particular lock mode on a lockable database object 112 at a time. As an example, a database process 130 may acquire an access-exclusive-mode lock 147 on a database table that allows for only the database process 130 to read and modify the database table while the lock 147 is held. In some cases, lock modes may conflict such that a first database process 130 cannot acquire a lock mode while a second database process 130 holds a particular lock mode. For example, database process 130A may hold an access-exclusive-mode lock 147 on a database table and as a result, a database process 130C cannot acquire an access-share-mode lock 147 on the database table. Database process 130C may enter a lock wait queue 145 while it waits to acquire the access-share-mode lock 147.

A lock wait queue 145, in various embodiments, is a queue that maintains indications of database processes 130 that are waiting to acquire a lock 147 on a respective database object 112. Each lockable database object 112 may have its own lock wait queue 145. If a database process 130 seeks to acquire a lock 147 but is not permitted (for reasons discussed above), the database process 130 may be added to a lock wait queue 145. In some embodiments, a database process 130 sends a request to lock manager 140 for a particular lock 147, and lock manager 140 adds an indication of that database process 130 to the corresponding lock wait queue 145 if that database process has to wait. For example, database process 130C may issue a request for a lock 147 on a lockable database object 112 associated with lock wait queue 145B. But as shown, database process 130A holds a lock 147B on the lockable database object 112 and thus lock manager 140 adds an indication of database process 130 to lock wait queue 145B. In some embodiments, instead of a lock manager 140 storing indications in lock wait queues 145, database processes 130 store the indications themselves.

In various embodiments, a database process 130 exits a lock wait queue 145 in response to the occurrence of certain events. In some cases, a database process 130 may exit a lock wait queue 145 in response to being granted the requested lock 147. In some cases, a database process 130 may exit a lock wait queue 145 in response to a timeout event (e.g., it waits until a timeout occurs as specified in the SQL text). In some cases, a database process 130 may exit a lock wait queue 145 in response to an error event. As used herein, a database process 130 is described as prematurely exiting a lock wait queue 145 if it exits without obtaining a lock 147 on the corresponding lockable database object 112.

A trace file 150, in various embodiments, includes a set of trace records 155. In some cases, a trace file 150 corresponds to a single lock wait queue 145 and thus include trace records 155 specific to that lock wait queue 145. A trace record 155, in various embodiments, includes information pertaining to a database process 130's interactions with a lock wait queue 145 and its associated lock 147. For example, a trace record 155 may identify when a database process 130 attempted to acquire a lock 147, when it acquired the lock 147, and/or when it released the lock 147. In some embodiments, trace records 155 may be written by database processes 130, lock manager 140, or a batch process that writes those trace records 155 based on information collected by database processes 130 and/or lock manager 140. For example, periodically, the batch process may write out trace record 155 to a trace file 150, where the trace records 155 cover a time frame lasting from the last write out to the current write out. Using the information included in a set of trace records 155, a timeline may be constructed that identifies how long culprit processes were holding locks 147 and how long victim processes were waiting in lock wait queues 145. Accordingly, the timeline may be used to identify those database processes 130 that cause undesirable wait times for other database processes 130 that are acquiring a lock 147 on a lockable database object 112. An example of a timeline is discussed in greater detail with respect to FIG. 4.

Turning now to FIG. 2A, a block diagram of example contents of a lock manager 140 is shown. In the illustrated embodiment, lock manager 140 includes a lock wait queue 145 (that includes an indication of a database process 130A) and a process list 200. As further shown, process list 200 includes process information 210A and 210B, trace information 220A and 220B, and lock information 230A and 230B. Also as shown, a database process 130B has acquired a lock 147 that corresponds to lock wait queue 145. In some embodiments, lock manager 140 is implemented differently than shown. For example, process list 200 may not be part of lock manager 140, but rather stored in a shared storage that database processes 130 can read from and write to without interfacing with lock manager 140. As such, database processes 130 may fulfill the roles of lock manager 140.

Process list 200, in various embodiments, is a collection of information about database processes 130 that are holding/waiting for a lock 147. A new entry in process list 200 may be added when a database process 130 attempts to acquire a lock 147. For example, when database process 130A attempts to acquire a lock 147, an indication of database process 130A (e.g., a process ID) may be inserted into lock wait queue 145 and a new entry (e.g., process information 210A, trace information 220A, and lock information 230A) may be added to process list 200. In some embodiments, the information included in process list 200 is written by lock manager 140 in response to requests from database processes 130 or the occurrence of events relating to those database processes 130 (e.g., the release of a lock 147); in other embodiments, process list 200 is directly written to by database processes 130.

Process information 210, in various embodiments, includes information pertaining to a database process 130. As an example, process information 210 may specify a process ID for a database process 130 and a set of permissions granted to that database process 130. In some embodiments, process information 210 specifies information about the database operation that a database process 130 wishes to perform once a lock 147 is acquired. As an example, process information 210 may specify a SQL statement that is being implemented by a database process 130 and a transaction ID associated with that SQL statement. In various embodiments, process information 210 is written to process list 200 by lock manager 140 (or a database process 130) when the database process 130 attempts to acquire a lock 147. As an example, lock manager 140 may receive a lock request from a database process 130 for a lock 147; the request may specify information relating to the database process 130 and its transaction 135, such as a process ID and a SQL statement. Lock manager 140 may then write that information to a corresponding entry of process list 200 as process information 210. In various embodiments, process information 210 is written out in a trace record 155. For example, if a trace record 155 is written out to database 110 for database process 130A, then the trace record 155 may include process information 210A.

Trace information 220, in various embodiments, includes information that relates to a database process 130's acquisition and release of a lock 147. As discussed in more detail with respect to FIG. 2B, in various embodiments, trace information 220 specifies a set of timestamps that may be used with other timestamps for other database process 130 to construct a timeline for lock wait queue 145. In various embodiments, trace information 220 is written to process list 200 by lock manager 140 (or a database process 130) over time. As an example, when a database process 130 attempts to acquire a lock 147, a timestamp may be recorded; when the database process 130 later releases the acquired lock 147, another timestamp may be recorded as part of trace information 220. The type of timestamps recorded in trace information 220A may be different than the type of timestamps recorded in trace information 220B. For example, trace information 220A might specify a release timestamp while trace information 220B may not. In various embodiments, trace information 220 is written out in a trace record 155. For example, if a trace record 155 is written out to database 110 for database process 130A, then the trace record 155 may include trace information 220A.

Lock information 230, in various embodiments, includes information pertaining to the locks 147 being acquired or already acquired by a database process 130. As an example, lock information 230 may identify what type/mode of lock 147 is being acquired (e.g., an exclusive-access mode, share-access mode, etc.) and whether the mode has been acquired. For example, as shown, database process 130B has acquired a lock 147 on the associated lockable database object 112. Accordingly, lock information 230B may indicate that database process 130B holds a lock 147 for that lockable database object 112 and the mode of that lock 147. In some cases, lock information 230 may identify locks 147 that a database process 130 has acquired on other lockable database object 112, as a database process might hold multiple locks 147 on multiple objects 112. In some embodiments, lock information 230 is written when a database process 130 issues a request to lock manager 140 for a lock 147. Lock information 230 may then be updated when the database process 130 is granted the lock 147. In various embodiments, lock information 230 is written out in a trace record 155. For example, if a trace record 155 is written out to database 110 for database process 130A, then the trace record 155 may include lock information 230A.

Turning now to FIG. 2B, a block diagram of example trace information 220 is shown. In the illustrated embodiment, trace information 220 includes an acquisition attempt timestamp 222, an acquisition timestamp 224, and a release timestamp 226. In some embodiments, trace information 220 is implemented differently than shown. As an example, trace information 220 may specify a lock mode associated with timestamps 222, 224, and 226.

Acquisition attempt timestamp 222, in various embodiments, identifies a time at which a database process 130 attempted to acquire a lock 147. A database process 130 can be said to attempt to acquire a lock 147 when it issues a request to lock manager 140 for a lock 147 or when it checks process list 200 to determine if it can take a lock 147 in cases in which there is not a lock manager 140. As a result, acquisition attempt timestamp 222 may be recorded prior to a database process 130 entering a lock wait queue 145. Acquisition timestamp 224, in various embodiments, identifies a time at which a database process 130 actually acquired a lock 147. For example, an acquisition timestamp 224 may be recorded when a database process 130 is released from a lock wait queue 145 with a lock 147. Release timestamp 226, in various embodiments, identifies a time at which a database process 130 released a lock 147 acquired at an earlier time. As such, a release timestamp 226 may be recorded when a database process 130 releases a lock 147. In various embodiments, only one acquisition attempt timestamp 222, one acquisition timestamp 224, and one release timestamp 226 are recorded per lock mode per database process 130. But in various cases, a database process 130 may acquire different lock modes and thus there may be multiple of each timestamp associated with the database process 130.

As mentioned, in some cases, a database process 130 might not acquire a lock 147 but instead prematurely exit from a lock wait queue 145. Consequently, an acquisition timestamp 224 and a release timestamp 226 are not recorded for that database process 130's attempt to acquire a lock 147. But in various embodiments, a timestamp may be recorded that identifies a time at which the database process 130 prematurely exits from a lock wait queue 145. That timestamp along with an acquisition attempt timestamp 222 may be written out in a trace record 155 for that database process 130.

Figure 3A:
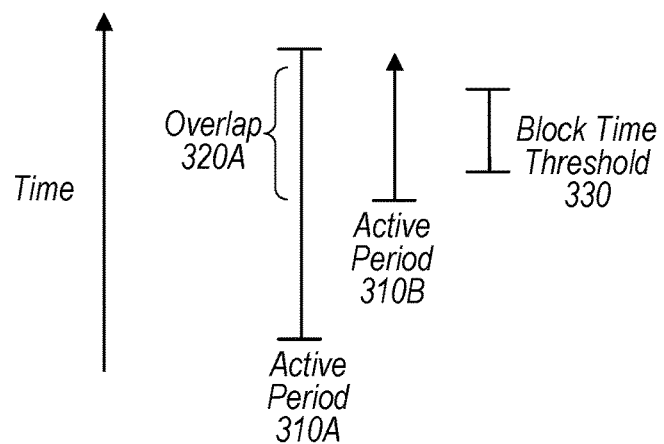
FIG. 3A-C are block diagrams illustrating example elements of different scenarios that relate to outputting or not outputting trace records, according to some embodiments.

Turning now to FIG. 3A, a block diagram of an example scenario in which a trace record 155 is to be outputted is shown. In the illustrated embodiment, there is an active period 310A that corresponds to a first database process 130 and an active period 310B that corresponds to a second database process 130. An active period 310, in various embodiments, is indicative of a time frame in which a database process 130 has been in contention for a lock 147. In various cases, an active period 310 extends from a time indicated by an acquisition attempt timestamp 222 to a time indicated by a release timestamp 226. In some cases, an active period 310 extends from a time indicated by an acquisition attempt timestamp 222 to a time when a process 130 prematurely exited from a lock wait queue 145. For purposes of facilitating this discussion, the database process 130 associated with active period 310A is a culprit process 130 that has caused the database process 130 associated with active period 310B to be a victim process 130 that has had to wait for a lock 147.

When the culprit process 130 releases a lock 147, in various embodiments, the culprit process 130 determines whether a trace record 155 should be written. As a part of making that determination, the culprit process 130 may determine whether its active period 310 satisfies a block time threshold 330. A block time threshold 330, in various embodiments, is a value that may be set to control the number of trace records 155 that are outputted. Instead of a database process 130 outputting a trace record 155 every time it releases a lock 147, it may be desirable to reduce the number of outputted trace records 155 by having only those processes 130 that have been in contention for a lock 147 for a reasonable amount of time output a trace record 155. Accordingly, the culprit process 130 associated with active period 310A may determine whether active period 310A is greater than (or equal, in some cases) block time threshold 330. In response to determining that active period 310A does not satisfy block time threshold 330, in various embodiments, the culprit process 130 does not cause a trace record 155 to be created when it releases a lock 147.

In response to determining that active period 310A does satisfy block time threshold 330 (as shown), in various embodiments, the culprit process 130 determines whether there are any victim processes 130 waiting in lock wait queue 145. If there are victim processes 130, in some cases, the culprit process 130 then causes a trace record 155 to be created. In other cases, the culprit process 130 determines whether an overlap 320 between the culprit process 130 and a victim process 130 satisfies block time threshold 330. In some embodiments, an overlap 320 is calculated by taking the different between a current time and the most recent time indicated by the acquire attempt timestamp 222 that corresponds to the victim process 130 or the acquire attempt timestamp 222 that corresponds to the culprit process 130 (whichever one indicates a more recent time). As discussed this information may be acquired from entries in process list 200. If the determined overlap 320 satisfies block time threshold 330, then the culprit process 130 may cause a trace record 155 to be created; otherwise, the culprit process 130 does not. As shown, active period 310A satisfies block time threshold 330 and an overlap 320A between active period 310A and active period 310B satisfies block time threshold 330 and thus a trace record 155 is outputted.

Figure 3B:
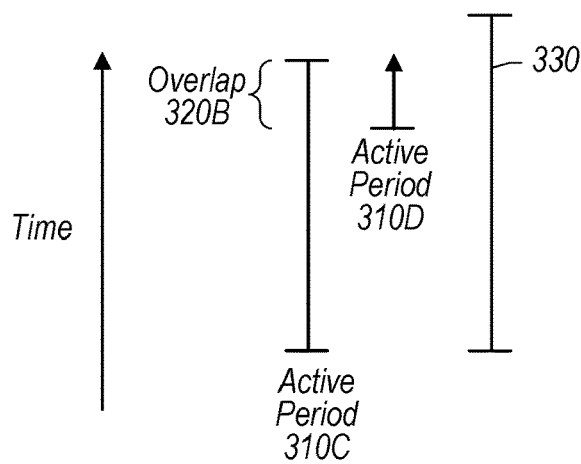

Turning now to FIG. 3B, a block diagram of an example scenario in which a trace record 155 is not to be outputted is shown. In the illustrated embodiment, there is an active period 310C of a culprit database process 130 and an active period 310D of a victim database process 130. As illustrated, active period 310C does not satisfy block time threshold 330, and thus the culprit process 130 may not cause a trace record 155 to be outputted. Furthermore, an overlap 320B between active period 310C and active period 310D does not satisfy block time threshold 330.

Figure 3C:
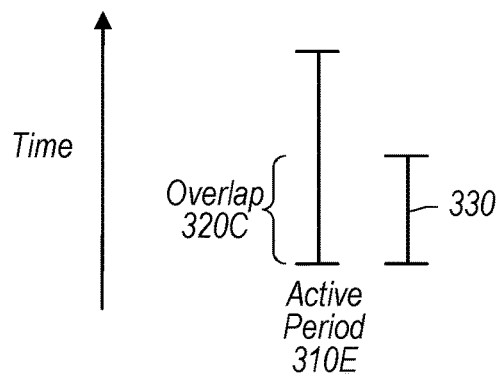

Turning now to FIG. 3C, a block diagram of an example scenario in which a trace record 155 is to be outputted is shown. The illustrated embodiment corresponds to the certain scenario in which a database process 130 prematurely exits from a lock wait queue 145 without a lock 147. In various embodiments, the database process 130 determines if there is a victim process 130 that was waiting behind it in the lock wait queue 145. If there is a victim process 130, then the prematurely-exiting culprit process 130 may cause a trace record 155 to be created. In some cases, the prematurely-exiting culprit process 130 may determine whether its active period 310 satisfies block time threshold 330. If the prematurely-exiting culprit process 130 is blocking a victim process 130 and its active period 310 satisfies block time threshold 330, then it may cause a trace record 155 to be created. As illustrated, an active period 310E of a prematurely-exiting culprit process 130 satisfies block time threshold 330 and thus, the prematurely-exiting culprit process 130 produces a trace record 155.

While not illustrated in FIGS. 3A-C, in various embodiments, a victim process 130 may also causes a trace record 155 to be created. In some cases, after the victim process 130 actually acquires a lock 147, that process 130 may cause a trace record 155 to be created that specifies an acquisition attempt timestamp 222 and an acquisition timestamp 224. The trace record 155 may be created if the length of time between the two timestamps satisfies block time threshold 330. In various cases, a database process 130 may output two trace records 155 if the database process 130 is both a victim and a culprit. In some cases, one trace record 155 is created that includes information pertaining to a database process 130's role as both a victim and a culprit.

Figure 4:
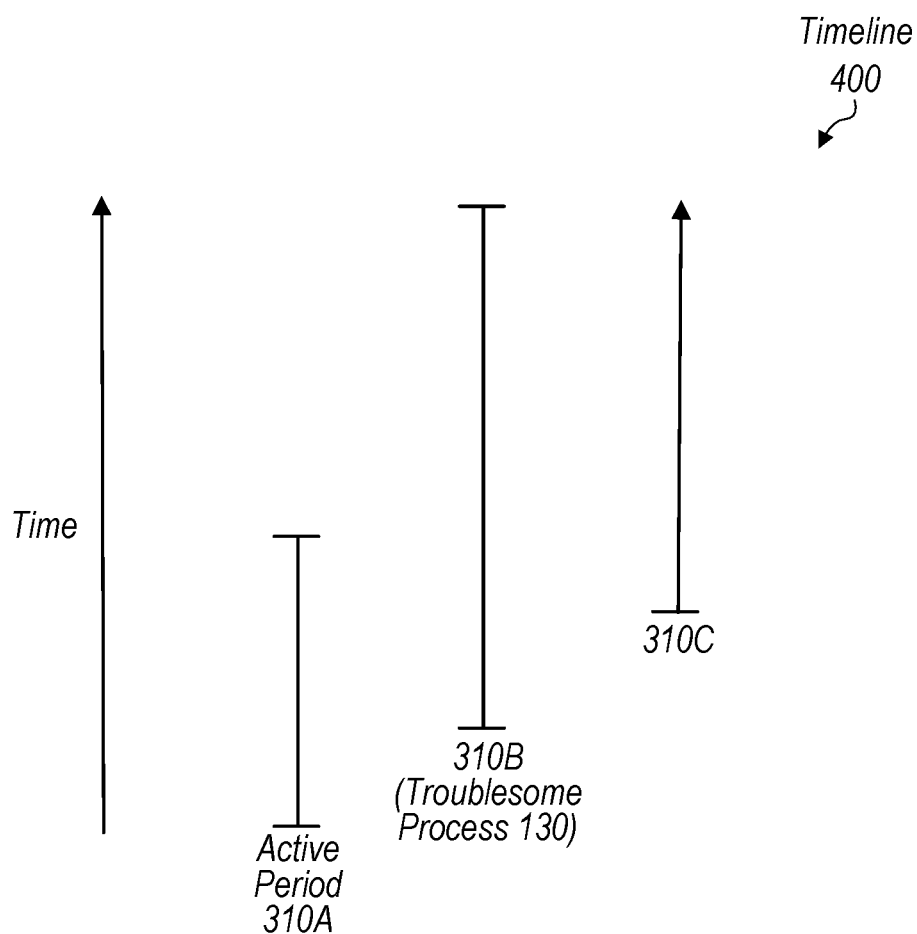
FIG. 4 is a block diagram illustrating example elements of a procedure for identifying a troublesome process, according to some embodiments.

Turning now to FIG. 4, a block diagram of an example timeline 400 constructed from a set of trace records 155 is shown. In the illustrated embodiment, there are active periods 310A, 310B, and 310C. In various embodiments, a timeline 400 is built as part of a post-processing procedure that is performed in response to a request from a user. In various cases, system 100 may receive a request from a user that specifies a process ID for a victim process 130. Based on the process ID, system 100 may access trace records 155 that are associated with the process ID, including trace records 155 belonging to those processes 130 that were culprits to the victim process 130 associated with the process ID. System 100 may then build and present a timeline 400 to the user that is based on the accessed trace records 155. For purposes of facilitating this discussion, active period 310C belongs to the victim process 130 and active periods 310A and 310B belong to two culprit processes 130 that temporarily blocked the victim process 130. As shown, active period 310B constitutes most of the time that the victim process 130 was blocked since there is minimal overlap between active periods 310A and 310C. As a result, a developer may determine that the database process 130 for active period 310B is a troublesome process 130. With this knowledge, the developer may be able to correct issues with that process 130 in order to prevent it from blocking the victim process 130 for so long in the future.

Figure 5:
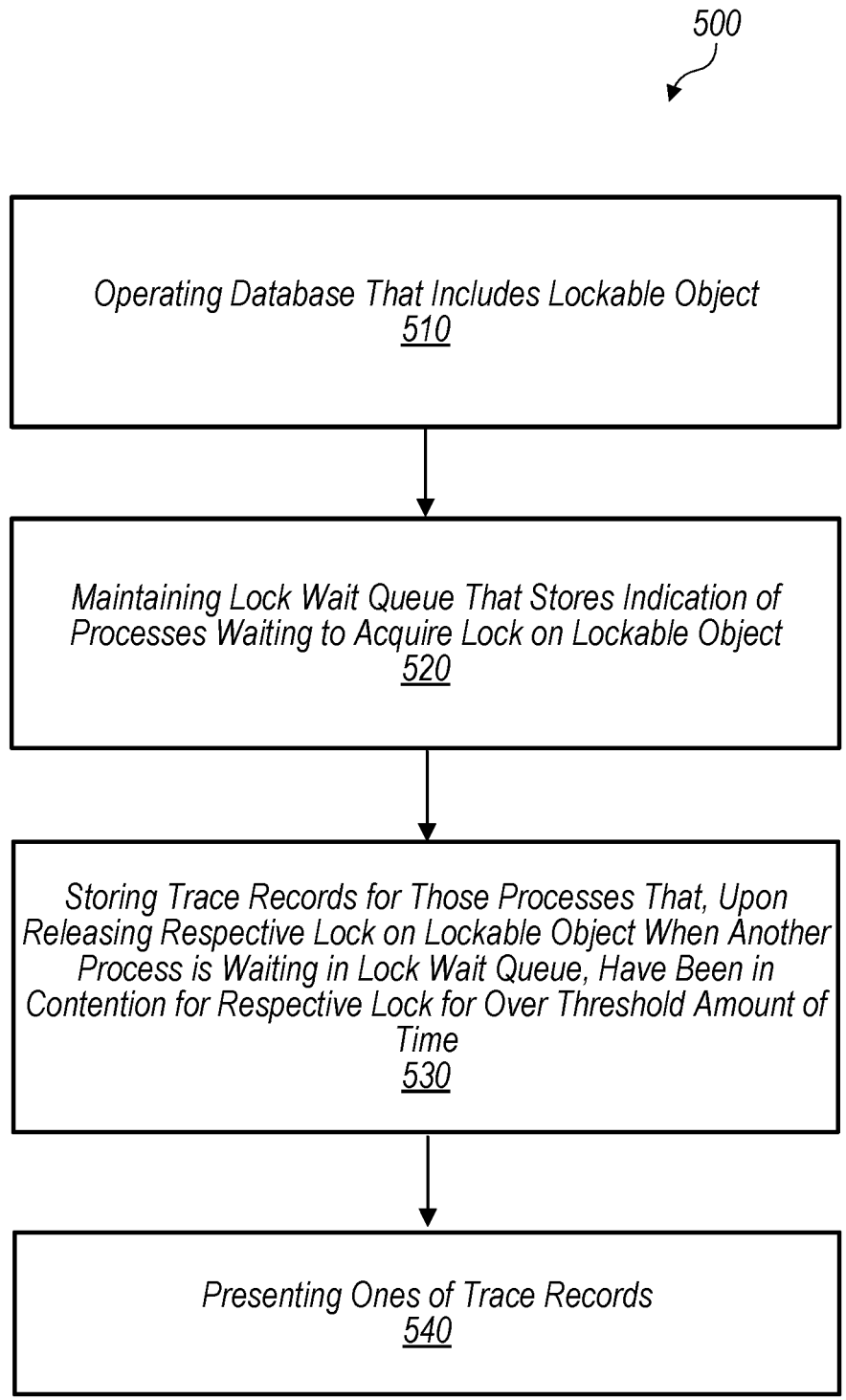
FIGS. 5 and 6 are flow diagrams illustrating example methods that pertain to lock wait tracing, according to some embodiments.

Turning now to FIG. 5, a flow diagram of a method 500 is shown. Method 500 is one embodiment of a method performed by a computer system (e.g., database node 120) in order to implement lock wait tracing. Method 500 may be performed by executing a set of program instructions stored on a non-transitory computer-readable medium (e.g., memory 820). In some embodiments, method 500 may include more or less steps than shown. As an example, method 500 may include a step in which the computer system creates a timeline based on one or more trace records (e.g., trace records 155).

Method 500 begins in step 510 with the computer system operating a database (e.g., database 110) that includes a lockable object (e.g., a lockable database object 112). In various embodiments, the lockable object is associated with a plurality of lock modes (e.g., an access exclusive mode, an access share mode, etc.) that can be acquired by processes (e.g., database processes 130) of the computer system. In step 520, the computer system maintains a lock wait queue (e.g., a lock wait queue 145) that stores an indication of processes waiting to acquire a lock (e.g., a lock 147) on the lockable object.

In step 530, the computer system stores trace records for those processes that, upon releasing a respective lock on the lockable object when another process is waiting in the lock wait queue, have been in contention (e.g., active period 310) for the respective lock for over a threshold amount of time (e.g., block time threshold 330). In some cases, the computer system may execute a particular process that is operable to record a first timestamp (e.g., an acquisition attempt timestamp 222) that is indicative of when the particular process attempted to acquire a particular lock and a second timestamp (e.g., a release timestamp 226) indicative of when the particular process released that lock. The particular process may make a determination that a duration from a time indicated by the first timestamp to a time indicated by the second timestamp satisfies the threshold amount of time. In response to making the determination, the particular process may output a trace record specifying the first and second timestamps. In some cases, the first timestamp may be recorded by the particular process before entering the lock wait queue.

In some cases, the computer system may execute a particular process that is operable to enter the lock wait queue after determining that another process holds a lock. In response to waiting for a threshold amount of time, the particular process may exit the lock wait queue and output a trace record that identifies a first timestamp that is indicative of when the particular process attempted to acquire a lock and a second timestamp indicative of when the particular process exited the lock wait queue.

In some cases, the computer system may execute a particular process that is operable to acquire a particular lock on the lockable object. In response to acquiring the particular lock, the particular process may output a trace record that identifies a first timestamp indicative of when the particular process attempted to acquire the particular lock and a second timestamp (e.g., an acquisition timestamp 224) that is indicative of when the particular process actually acquired the particular lock. In some cases, the particular process may release the particular lock without outputting an additional trace record in response to determining that there are no processes waiting in the lock wait queue. In some cases, the particular process may determine that there is at least one process waiting in the lock wait queue and release the particular lock without outputting a trace record in response to determining that the particular process has been in contention for the particular lock for over the threshold amount of time.

In step 540, the computer system presents ones of the trace records. The presented trace records may identify a timeline that is usable to determine a set of processes that contributed to a delay in a victim process acquiring a lock on the lockable object. A given one of the trace records may identify a respective one of the plurality of lock modes that was acquired by a corresponding process on the lockable object. Presenting ones of the trace records may be performed in response to receiving a request to present trace records associated with the victim process. The request may specify an identifier of the victim process, and the computer system may retrieve one or more trace records that correspond to the identifier of the victim process.

Figure 6:
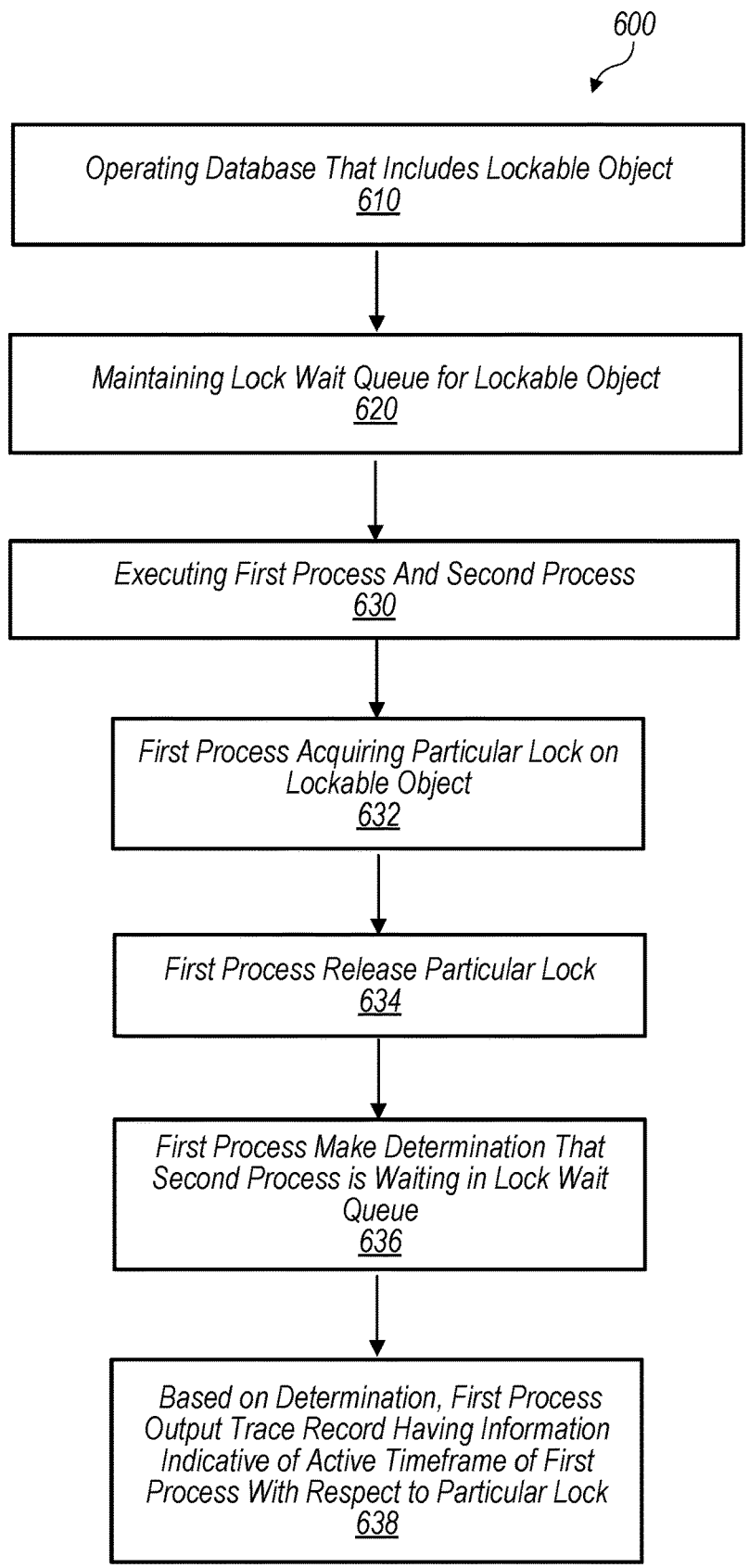

Turning now to FIG. 6, a flow diagram of a method 600 is shown. Method 600 is one embodiment of a method performed by a computer system (e.g., database node 120) in order to implement lock wait tracing. Method 600 may be performed by executing a set of program instructions stored on a non-transitory computer-readable medium (e.g., memory 820). In some embodiments, method 600 may include more or less steps than shown. As an example, method 600 may include a step in which the computer system creates a timeline based on one or more trace records (e.g., trace records 116).

Method 600 begins in step 610 with the computer system operating a database (e.g., database 110) that includes a lockable object (e.g., a lockable database object 112). In step 620, the computer system maintaining a lock wait queue (e.g., a lock wait queue 145) for the lockable object. A given process (e.g., database process 130C) that is attempting to acquire a given lock (e.g., a lock 147) on the lockable object may be operable to wait in the lock wait queue in response to a lock being held on the lockable object by another given process (e.g., database process 130A).

In step 630, the computer system executes a first process and a second process. In step 632, the first process acquires a particular lock on the lockable object. In step 634, the first process releases the particular lock. In step 636, the first process makes a determination that the second process is waiting in the lock wait queue. In step 638, based on the determination, the first process outputs a trace record having information indicative of an active timeframe (e.g., an active period 310) of the first process with respect to the particular lock. In various embodiments, the information included in the trace record specifies a first timestamp (e.g., an acquisition attempt timestamp 222) indicative of when the first process attempted to acquire the particular lock and a second timestamp (e.g., a release timestamp 226) indicative of when the first process released the particular lock.

The computer system may execute a third process that is operable to enter the lock wait queue in response to determining that the first process holds the particular lock. In response to waiting for a threshold amount of time, the third process may exist the lock wait queue and output a trace record having information that includes a first timestamp indicative of when the third process attempted to acquire the particular lock and a second timestamp indicative of when the third process exited the lock wait queue.

Exemplary Multi-Tenant Database System

Figure 7:
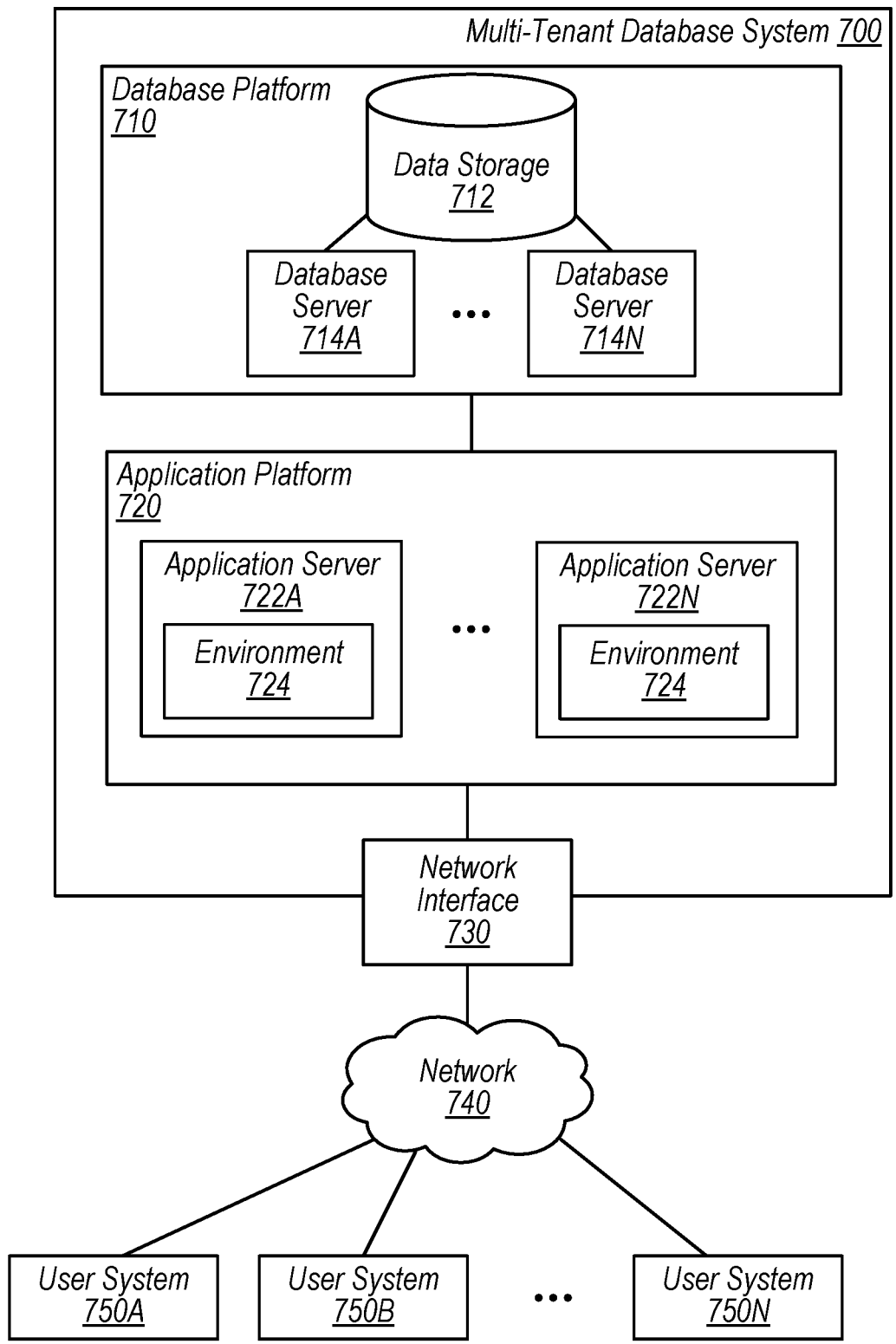
FIG. 7 is a block diagram illustrating elements of a multi-tenant system, according to some embodiments.

Turning now to FIG. 7, an exemplary multi-tenant database system (MTS) 700 in which various techniques of the present disclosure can be implemented is shown—e.g., system 100 may be MTS 700. In FIG. 7, MTS 700 includes a database platform 710, an application platform 720, and a network interface 730 connected to a network 740. Also as shown, database platform 710 includes a data storage 712 and a set of database servers 714A-N that interact with data storage 712, and application platform 720 includes a set of application servers 722A-N having respective environments 724. In the illustrated embodiment, MTS 700 is connected to various user systems 750A-N through network 740. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 700, in various embodiments, is a set of computer systems that together provide various services to users (alternatively referred to as "tenants") that interact with MTS 700. In some embodiments, MTS 700 implements a customer relationship management (CRM) system that provides mechanism for tenants (e.g., companies, government bodies, etc.) to manage their relationships and interactions with customers and potential customers. For example, MTS 700 might enable tenants to store customer contact information (e.g., a customer's website, email address, telephone number, and social media data), identify sales opportunities, record service issues, and manage marketing campaigns. Furthermore, MTS 700 may enable those tenants to identify how customers have been communicated with, what the customers have bought, when the customers last purchased items, and what the customers paid. To provide the services of a CRM system and/or other services, as shown, MTS 700 includes a database platform 710 and an application platform 720.

Database platform 710, in various embodiments, is a combination of hardware elements and software routines that implement database services for storing and managing data of MTS 700, including tenant data. As shown, database platform 710 includes data storage 712. Data storage 712, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 712 is used to implement a database (e.g., database 110) comprising a collection of information that is organized in a way that allows for access, storage, and manipulation of the information. Data storage 712 may implement a single database, a distributed database, a collection of distributed databases, a database with redundant online or offline backups or other redundancies, etc. As part of implementing the database, data storage 712 may store files (e.g., trace files 150) that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 700 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that one tenant does not have access to another tenant's data, unless such data is expressly shared.

In some embodiments, the data stored at data storage 712 is organized as part of a log-structured merge-tree (LSM tree). An LSM tree normally includes two high-level components: an in-memory cache and a persistent storage. In operation, a database server 714 may initially write database records into a local in-memory cache before later flushing those records to the persistent storage (e.g., data storage 712). As part of flushing database records, the database server 714 may write the database records into new files that are included in a "top" level of the LSM tree. Over time, the database records may be rewritten by database servers 714 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 712.

When a database server 714 wishes to access a database record for a particular key, the database server 714 may traverse the different levels of the LSM tree for files that potentially include a database record for that particular key. If the database server 714 determines that a file may include a relevant database record, the database server 714 may fetch the file from data storage 712 into a memory of the database server 714. The database server 714 may then check the fetched file for a database record having the particular key. In various embodiments, database records are immutable once written to data storage 712. Accordingly, if the database server 714 wishes to modify the value of a row of a table (which may be identified from the accessed database record), the database server 714 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 714, in various embodiments, are hardware elements, software routines, or a combination thereof capable of providing database services, such as data storage, data retrieval, and/or data manipulation. A database server 714 may correspond to a database node 120. Such database services may be provided by database servers 714 to components (e.g., application servers 722) within MTS 700 and to components external to MTS 700. As an example, a database server 714 may receive a database transaction request from an application server 722 that is requesting data to be written to or read from data storage 712. The database transaction request may specify an SQL SELECT command to select one or more rows from one or more database tables. The contents of a row may be defined in a database record and thus database server 714 may locate and return one or more database records that correspond to the selected one or more table rows. In various cases, the database transaction request may instruct database server 714 to write one or more database records for the LSM tree—database servers 714 maintain the LSM tree implemented on database platform 710. In some embodiments, database servers 714 implement a relational database management system (RDMS) or object oriented database management system (OODBMS) that facilitates storage and retrieval of information against data storage 712. In various cases, database servers 714 may communicate with each other to facilitate the processing of transactions. For example, database server 714A may communicate with database server 714N to determine if database server 714N has written a database record into its in-memory cache for a particular key.

Application platform 720, in various embodiments, is a combination of hardware elements and software routines that implement and execute CRM software applications as well as provide related data, code, forms, web pages and other information to and from user systems 750 and store related data, objects, web page content, and other tenant information via database platform 710. In order to facilitate these services, in various embodiments, application platform 720 communicates with database platform 710 to store, access, and manipulate data. In some instances, application platform 720 may communicate with database platform 710 via different network connections. For example, one application server 722 may be coupled via a local area network and another application server 722 may be coupled via a direct network link. Transfer Control Protocol and Internet Protocol (TCP/IP) are exemplary protocols for communicating between application platform 770 and database platform 710, however, it will be apparent to those skilled in the art that other transport protocols may be used depending on the network interconnect used.

Application servers 722, in various embodiments, are hardware elements, software routines, or a combination thereof capable of providing services of application platform 720, including processing requests received from tenants of MTS 700. Application servers 722, in various embodiments, can spawn environments 724 that are usable for various purposes, such as providing functionality for developers to develop, execute, and manage applications (e.g., business logic). Data may be transferred into an environment 724 from another environment 724 and/or from database platform 710. In some cases, environments 724 cannot access data from other environments 724 unless such data is expressly shared. In some embodiments, multiple environments 724 can be associated with a single tenant.

Application platform 720 may provide user systems 750 access to multiple, different hosted (standard and/or custom) applications, including a CRM application and/or applications developed by tenants. In various embodiments, application platform 720 may manage creation of the applications, testing of the applications, storage of the applications into database objects at data storage 712, execution of the applications in an environment 724 (e.g., a virtual machine of a process space), or any combination thereof. In some embodiments, application platform 720 may add and remove application servers 722 from a server pool at any time for any reason, there may be no server affinity for a user and/or organization to a specific application server 722. In some embodiments, an interface system (not shown) implementing a load balancing function (e.g., an F5 Big-IP load balancer) is located between the application servers 722 and the user systems 750 and is configured to distribute requests to the application servers 722. In some embodiments, the load balancer uses a least connections algorithm to route user requests to the application servers 722. Other examples of load balancing algorithms, such as are round robin and observed response time, also can be used. For example, in certain embodiments, three consecutive requests from the same user could hit three different servers 722, and three requests from different users could hit the same server 722.

In some embodiments, MTS 700 provides security mechanisms, such as encryption, to keep each tenant's data separate unless the data is shared. If more than one server 714 or 722 is used, they may be located in close proximity to one another (e.g., in a server farm located in a single building or campus), or they may be distributed at locations remote from one another (e.g., one or more servers 714 located in city A and one or more servers 722 located in city B). Accordingly, MTS 700 may include one or more logically and/or physically connected servers distributed locally or across one or more geographic locations.

One or more users (e.g., via user systems 750) may interact with MTS 700 via network 740. User system 750 may correspond to, for example, a tenant of MTS 700, a provider (e.g., an administrator) of MTS 700, or a third party. Each user system 750 may be a desktop personal computer, workstation, laptop, PDA, cell phone, or any Wireless Access Protocol (WAP) enabled device or any other computing device capable of interfacing directly or indirectly to the Internet or other network connection. User system 750 may include dedicated hardware configured to interface with MTS 700 over network 740. User system 750 may execute a graphical user interface (GUI) corresponding to MTS 700, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 750 to access, process, and view information and pages available to it from MTS 700 over network 740. Each user system 750 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 700 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 750 may be users in differing capacities, the capacity of a particular user system 750 might be determined one or more permission levels associated with the current user. For example, when a salesperson is using a particular user system 750 to interact with MTS 700, that user system 750 may have capacities (e.g., user privileges) allotted to that salesperson. But when an administrator is using the same user system 750 to interact with MTS 700, the user system 750 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 700 that are allocated at the tenant level while other data structures are managed at the user level.

In some embodiments, a user system 750 and its components are configurable using applications, such as a browser, that include computer code executable on one or more processing elements. Similarly, in some embodiments, MTS 700 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VB Script.

Network 740 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 750 may communicate with MTS 700 using TCP/IP and, at a higher network level, use other common Internet protocols to communicate, such as HTTP, FTP, AFS, WAP, etc. For example, where HTTP is used, user system 750 might include an HTTP client commonly referred to as a "browser" for sending and receiving HTTP messages from an HTTP server at MTS 700. Such a server might be implemented as the sole network interface between MTS 700 and network 740, but other techniques might be used as well or instead. In some implementations, the interface between MTS 700 and network 740 includes load sharing functionality, such as round-robin HTTP request distributors to balance loads and distribute incoming HTTP requests evenly over a plurality of servers.

In various embodiments, user systems 750 communicate with application servers 722 to request and update system-level and tenant-level data from MTS 700 that may require one or more queries to data storage 712. In some embodiments, MTS 700 automatically generates one or more SQL statements (the SQL query) designed to access the desired information. In some cases, user systems 750 may generate requests having a specific format corresponding to at least a portion of MTS 700. As an example, user systems 750 may request to move data objects into a particular environment 724 using an object notation that describes an object relationship mapping (e.g., a JavaScript object notation mapping) of the specified plurality of objects.

Exemplary Computer System

Figure 8:
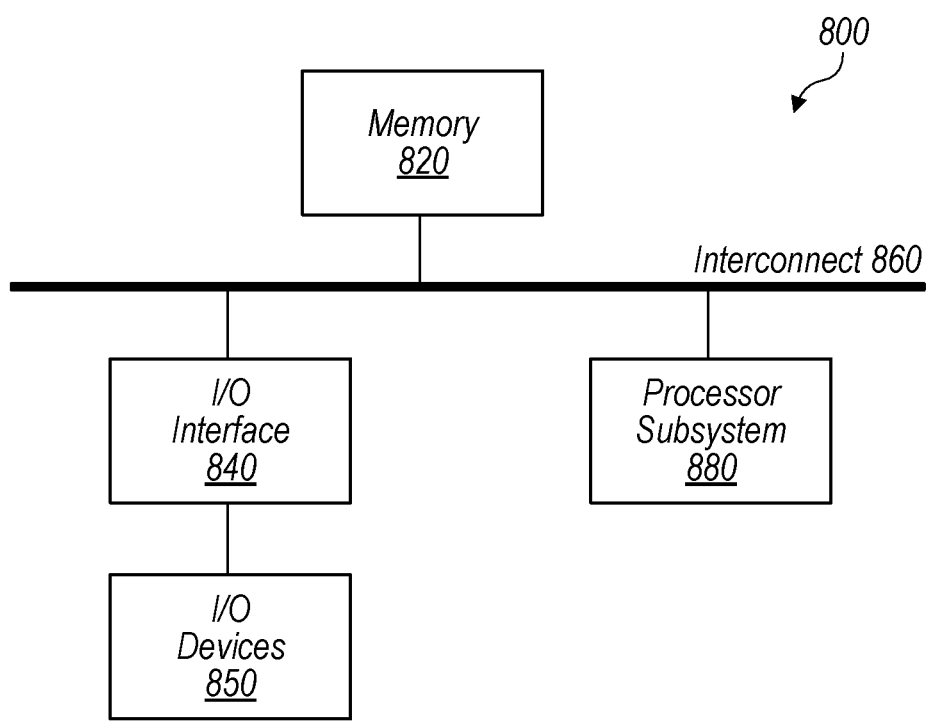
FIG. 8 is a block diagram illustrating elements of a computer system, according to some embodiments.

Turning now to FIG. 8, a block diagram of an exemplary computer system 800, which may implement system 100, database 110, database node 120, MTS 700, and/or user system 750, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement lock manager 140 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
operating, by a computer system, a database that includes a lockable object;
maintaining, by the computer system, a lock wait queue that stores an indication of processes waiting to acquire a lock on the lockable object;
storing, by the computer system, trace records for those processes that, upon releasing a respective lock on the lockable object when another process is waiting in the lock wait queue, have been in contention for the respective lock for over a threshold amount of time; and
presenting, by the computer system, ones of the trace records, wherein the presented trace records identify a timeline that is usable to determine a set of processes that contributed to a delay in a victim process acquiring a lock on the lockable object.

2. The method of claim 1, further comprising the computer system executing a particular process that is operable to:
record a first timestamp indicative of when the particular process attempted to acquire a particular lock and a second timestamp indicative of when the particular process released the particular lock;
make a determination that a duration from a time indicated by the first timestamp to a time indicated by the second timestamp satisfies a threshold amount of time; and
based on the determination, output a trace record that identifies the first and second timestamps.

3. The method of claim 2, wherein the first timestamp is recorded by the particular process before entering the lock wait queue.

4. The method of claim 1, further comprising the computer system executing a particular process that is operable to:
enter the lock wait queue after determining that another process holds a lock; and
in response to waiting for a threshold amount of time:
exit the lock wait queue; and
output a trace record that identifies a first timestamp that is indicative of when the particular process attempted to acquire a lock and a second timestamp that is indicative of when the particular process exited the lock wait queue.

5. The method of claim 1, further comprising the computer system executing a particular process that is operable to:
acquire a particular lock on the lockable object; and
in response to acquiring the particular lock, output a trace record that identifies a first timestamp that is indicative of when the particular process attempted to acquire the particular lock and a second timestamp that is indicative of when the particular process actually acquired the particular lock.

6. The method of claim 5, wherein the particular process is further operable to:

release the particular lock without outputting an additional trace record in response to determining that there are no processes waiting in the lock wait queue.

7. The method of claim 5, wherein the particular process is further operable to:
determine that there is at least one process waiting in the lock wait queue; and
release the particular lock without outputting a trace record based on determining that the particular process has not been in contention for the particular lock for over the threshold amount of time.

8. The method of claim 1, wherein the lockable object is associated with a plurality of lock modes, and wherein a given one of the trace records identifies a respective one of the plurality of lock modes acquired by a corresponding process on the lockable object.

9. A non-transitory computer readable memory device having program instructions stored thereon that are executable by a computer system to cause the computer system to perform operations comprising:
maintaining a lock wait queue that stores an indication of processes waiting to acquire a lock on a lockable object included in a database;
storing a set of trace records that includes trace records for those processes that, upon releasing a respective lock on the lockable object when another process is waiting in the lock wait queue, have been in contention for the respective lock for over a threshold amount of time; and
presenting ones of the set of trace records, wherein the presented trace records identify a timeline that is usable to determine a set of processes that contributed to a delay in a victim process acquiring a lock on the lockable object.

10. The non-transitory computer readable memory device of claim 9, wherein a particular one of the set of trace records identifies, for a process, a timestamp indicative of when the process attempted to acquire a particular lock on the lockable object and a timestamp indicative of when the process released the particular lock.

11. The non-transitory computer readable memory device of claim 9, wherein a particular one of the set of trace records identifies, for the victim process, a timestamp indicative of when the victim process attempted to acquire a particular lock on the lockable object and a timestamp indicative of when the victim process actually acquired the particular lock.

12. The non-transitory computer readable memory device of claim 9, wherein a particular one of the set of trace records identifies, for a process, a timestamp indicative of when the process attempted to acquire a particular lock on the lockable object and a timestamp indicative of when the process exited from the lock wait queue without acquiring the particular lock.

13. The non-transitory computer readable memory device of claim 9, wherein the lockable object is associated with a plurality of different lock modes acquirable on the lockable object, and wherein a given one of the set of trace records identifies, for a process, one of the plurality of different lock modes acquired by the process on the lockable object.

14. The non-transitory computer readable memory device of claim 9, wherein the operations further comprise:
receiving a request to present trace records associated with the victim process, wherein the request specifies an identifier of the victim process; and retrieving one or more of the set of trace records that correspond to the identifier of the victim process, wherein the one or more traces records are the presented trace records.

15. A method, comprising:

operating, by a computer system, a database that includes a lockable object;

maintaining, by the computer system, a lock wait queue for the lockable object, wherein a given process that is attempting to acquire a given lock on the lockable object is operable to wait in the lock wait queue in response to a lock being held on the lockable object by another given process; and executing, by the computer system, a first process and a second process, wherein the first process is operable to:

acquire a particular lock on the lockable object;

release the particular lock;

make a determination that the second process is waiting in the lock wait queue; and based on the determination, output a trace record having information indicative of an active timeframe of the first process with respect to the particular lock.

16. The method of claim 15, wherein the information included in the trace record specifies a first timestamp indicative of when the first process attempted to acquire the particular lock and a second timestamp indicative of when the first process released the particular lock.

17. The method of claim 15, further comprising:

executing, by the computer system, a third process that is operable to:

enter the lock wait queue in response to determining that the first process holds the particular lock; and in response to waiting for a threshold amount of time:

exit the lock wait queue; and output a trace record having information that includes a first timestamp indicative of when the third process attempted to acquire the particular lock and a second timestamp indicative of when the third process exited the lock wait queue.

18. The method of claim 15, wherein the second process is operable to:

acquire the particular lock; and in response to acquiring the particular lock, output a trace record having information that includes a first timestamp indicative of when the second process attempted to acquire the particular lock and a second timestamp indicative of when the second process actually acquired the particular lock.

19. The method of claim 15, wherein the first process attempted to acquire the lock after the second process.

20. The method of claim 15, further comprising:

writing a set of trace records to a file outside of the computer system for post-processing to determine, from a plurality of processes, at least one process that caused the second process to wait for a specified amount of time.

* * * * *